Sept. 3, 1968　　　　　D. L. BRUNT　　　　　3,399,919
PNEUMATICALLY CUSHIONED BUMPER
Filed March 18, 1965　　　　　　　　　　　　　2 Sheets-Sheet 1

INVENTOR.
DAVID L. BRUNT
BY
Williamson & Palmatier
ATTORNEYS

Sept. 3, 1968     D. L. BRUNT     3,399,919

PNEUMATICALLY CUSHIONED BUMPER

Filed March 18, 1965     2 Sheets-Sheet 2

INVENTOR.
DAVID L. BRUNT

BY
Williamson & Palmatier
ATTORNEYS

3,399,919
PNEUMATICALLY CUSHIONED BUMPER
David L. Brunt, 419 3rd Ave. W.,
Williston, N. Dak. 58801
Filed Mar. 18, 1965, Ser. No. 440,764
3 Claims. (Cl. 293—89)

This invention relates to air cushion devices which may be incorporated in apparatus for use in absorbing or cushioning shock impulses.

It is therefore the general object of this invention to provide an air cushion device, of simple and inexpensive construction, for use with an impact structure for effectively dampening shock impulses received by the impact structure.

A more specific object of this invention is to provide an air-cushioning device which may be effectively interposed between an impact structure such as an automobile bumper and the frame of the automobile which is effective for dampening or absorbing shock impulses from the bumper.

These and other objects and advantages of the invention will more fully appear from the following description made in connection with the accompanying drawings, wherein like character references refer to the same or similar parts throughout the several views, and in which:

FIG. 4 illustrates a pair of air cushioning devices used to support an automobile bumper; and FIG. 5 is a detailed cross-sectional view on an enlarged scale of one end portion of the air cushion device illustrating the pressure responsive means in an open condition.

Figure 1:
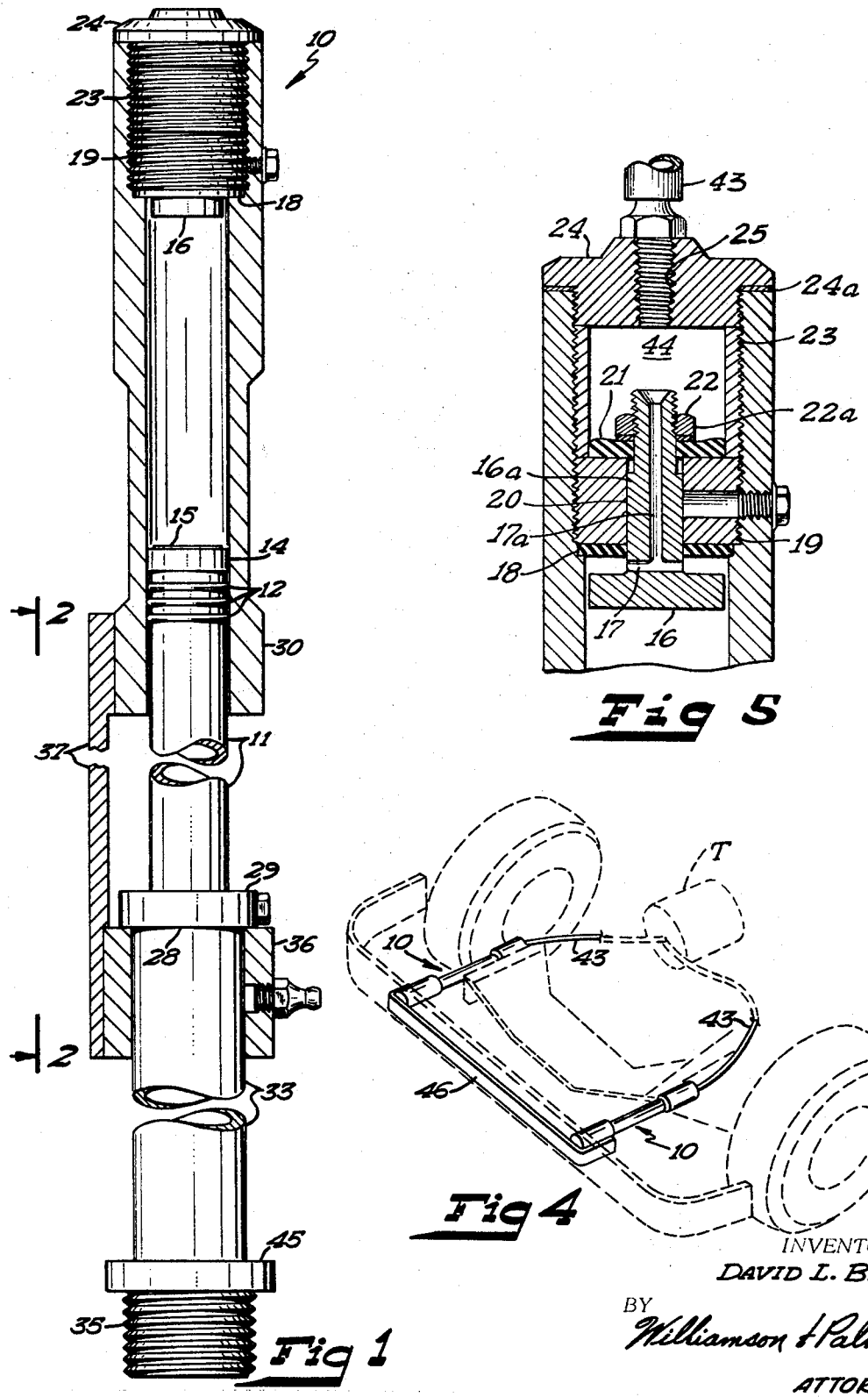
FIG. 1 is a longitudinal section view of an air cushion foreshortened for clarity.

Referring now to the drawings, and more specifically to FIG. 1, it will be seen that one embodiment of my novel air cushioning device is thereshown. This air cushioning device includes an elongate cylinder 10 which receives an elongate, generally tubular piston 11 therein. The piston 11 is axially reciprocable in the cylinder 10 and projects exteriorly from one end of the latter as in FIG. 1. Piston 11 includes a piston head which is provided with a plurality of longitudinally spaced apart annular recesses therein adjacent one end thereof, each of these recesses receiving an annular element or piston ring 12 therein. These piston rings 12 are preferably formed of a somewhat resilient yieldable material such as rubber, neoprene, or the like, and engage the inner wall surface of the cylinder in air-sealing relation therewith.

Figure 2:
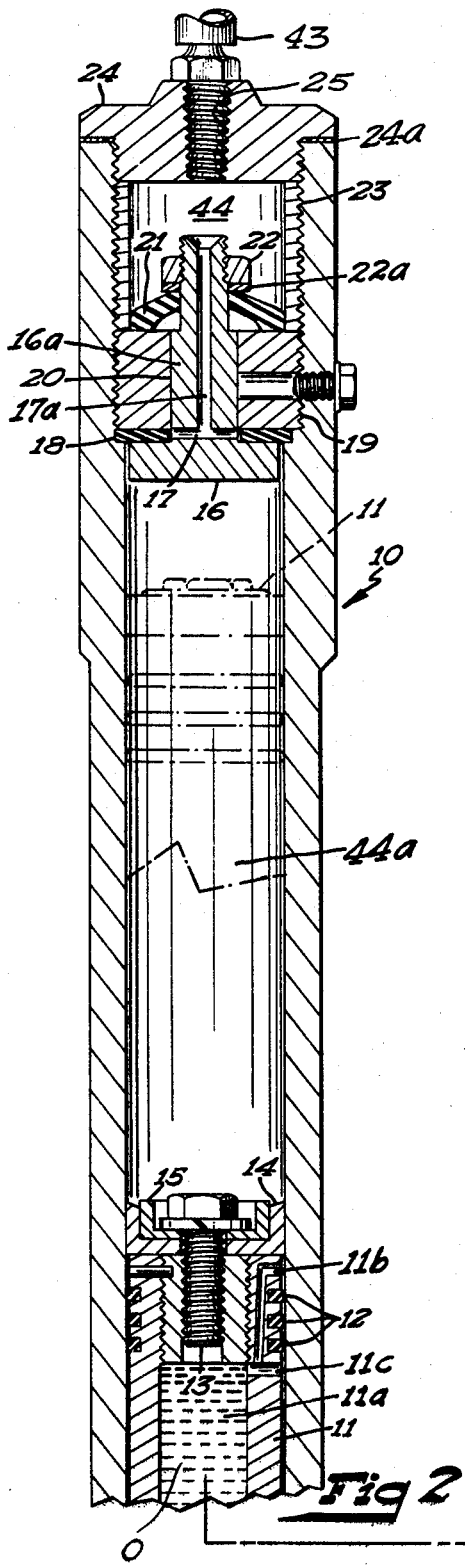
FIG. 2 is a detailed longitudinal sectional view on an enlarged scale of one end of the air cushion device.

The upper end of the piston 11, or that end which defines the piston head, is internally threaded and threadably receives an externally threaded sleeve therein. This sleeve has a threaded axial bore which threadably engages a bolt 13 as best seen in FIG. 2. A neoprene compression cup 14 is disposed in abutting relation against the end of the piston 11 and is retained thereon by metallic holding cup 15 which is suitably apertured to receive the shank of the bolt 13 thereto. It will be noted that the metallic holding cup 15 is positioned within the concavity of the neoprene compression cup and not only serves to urge and clamp the base of the cup against the end of the piston, but also serves to urge the peripheral flange of the cup against the inner surface of the cylinder. Thus, it will be noted that as the bolt 13 is tightened to urge the metallic holding cup 15 into clamping relation against the compression cup 14, the latter will be expanded to also form a seal with respect to the inner surface of the cylinder. The head of the piston 11 therefore engages the inner wall surface of the cylinder with air-sealing effect.

A substantially circular, flat, axially movable piston or element 16 is positioned within the cylinder 10 adjacent one end thereof as best seen in FIG. 2, and this piston 16 has an elongate stem 16a integrally formed therewith and projecting axially toward the adjacent end of the cylinder 11. This stem 16a has an axially extending passage 17a therein which communicates at one end of the stem with the interior of the cylinder 10 and which communicates with a radially extending passage 17 at its other end. An annular yieldable closure element 18 formed of a yieldable compressible material such as neoprene or the like is positioned around the stem 16a, and this annular yieldable closure element 18 is prevented from axial movement in one direction by engagement with an annular shoulder formed in the cylinder 10 as best seen in FIG. 2.

Movement of the resilient annular member 18 in the opposite direction is prevented by an exteriorly threaded sleeve 19 which threadably engages the internal threaded portions of the cylinder 10. The stem 16a of the piston 16 projects through the hollow bore of the sleeve 19 and thereafter through a yieldable member or cup 21, formed of neoprene, rubber or the like, the latter being clamped against the sleeve 19 by a nut 22 which threadably engages the end of the stem 16a. It will be noted that the free terminal portion of the stem 16a is of reduced cross-sectional size.

The sleeve 19 has one end thereof abutted against one end of an externally threaded sleeve 23 which threadably engages the internally threaded end of the cylinder 10. The rear open end of the cylinder 10 is closed by a closure member or plug 24 which threadably engages the cylinder 10 in sealed relation therewith. It will be noted that a compressible gasket 24a as interposed in sealing relation between the closure member 24 and the end of the cylinder 10 to effect a seal thereat. This closure member 24 is provided with a centrally located threaded opening therein which suitably accommodates a conventional fitting (not shown) which is connected by suitable conduit to a source of air under pressure which is preferably in the form of an air tank. In the preferred embodiment, it is desirable to provide an air tank having a 90 pound air pressure capacity. Thus, it will be seen that air will be introduced to the rear end portion of the cylinder 10 and this end portion of the cylinder comprises an entry chamber. The piston 16 is capable of axial movement in a direction away from the closure member 24 approximately one thirty-second of an inch in response to a pressure differential on opposite sides of the piston member 16. Movement of this piston 16 is made possible by compression or yielding of the annular element or washer 22a formed of a compressible yieldable material such as rubber or the like. Axial displacement of the piston 16 in a direction toward the piston 11 allows the radial ports or passages 17 to be intercommunicated with the interior of the cylinder 10 so that the pressure differential will be equalized in the inter-chamber 44 and the chamber 44a of the cylinder 10. This axial displacement of the piston 16 in the embodiment shown approximates only one thirty-second of an inch. This is sufficient to open ports or passages 17 with respect to the chamber 44a.

Figure 3:
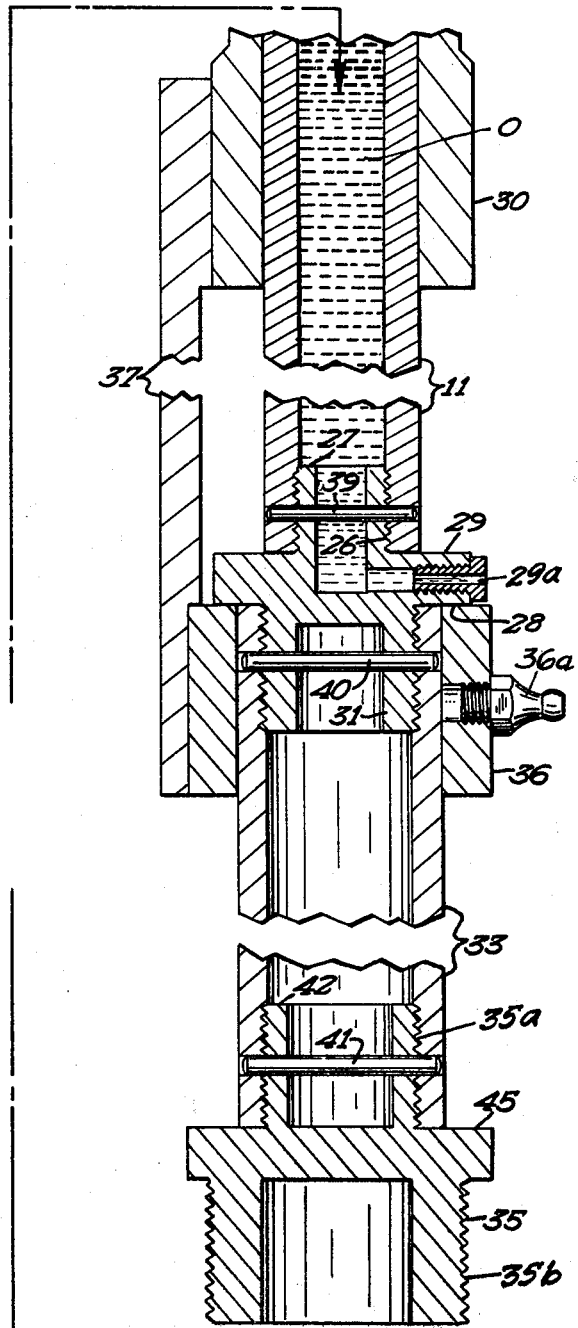
FIG. 3 is a longitudinal detailed sectional view on an enlarged scale of the other end of the air cushion device located opposite from that of FIG. 2.

Referring now to FIG. 3, it will be seen that the forward end of the tubular piston 11 is internally threaded as at 26, and threadably engages one end portion of an externally threaded closure member or plug 27. It will be noted that this closure member or plug 27 is provided with a radially extending annular jam ring or flange 28 which is integrally formed therewith, and which has one face thereof engaging the lower end of the tubular piston 11 for closing the same in sealed relation.

The closure member or plug 27 also has an externally threaded lower end 31 which is larger in cross-sectional dimension than the upper end thereof and which threadably engages the internally threaded end of an elongate thrust transmitting cylindrical member 33. The opposite or forward end of member 33 is internally threaded, and threadably receives the upper external end 35a of a coupling member 35. It will be noted that the coupling member 35 has an externally threaded lower end 35b of slightly greater diameter than the upper threaded end 35a, and is also provided with an intermediate radially projecting annular flange 45 which has its upper face engaging the lower end of the cylindrical member 33. It is pointed out that the end portion 35b of the coupling member is connectable to a conventional automobile bumper so that the bumper is mounted for yieldable movement in an inner direction.

In the event that the air cushion device is used to support a bumper of a vehicle, the air cushion device will be subjected to some vibration impulses during normal operation of the automobile. It is therefore desirable to assure that certain parts thereof are retained in their inter-engaged relation with respect to other parts, and to this end, it will be seen that suitable locking pins are provided. Attention is again directed to FIG. 3 wherein it will be seen that the locking pin 39 locks the closure member 27 against movement relative to the piston 11 while the locking pin 40 locks the closure member 27 against relative movement with respect to the cylindrical member 33. Similarly, a locking pin 41 prevents revolving movement of the coupling member 35 with respect to the cylindrical member 33.

Means are provided for mounting the air cushion device to the frame of an automobile or other vehicle when the same is used in conjunction with a vehicle bumer. To this end, a substantially flat mounting plate 37 is provided which has one end thereof rigidly affixed to one end portion 30 of the cylinder 10 by suitable securing means such as bolts or the like. The mounting plate 37 is also rigidly secured to a bearing sleeve 36 which slidably supports the cylindrical thrust transmitting member 33. It will be seen that sleeve 36 is provided with a lubricating fitting 36a. Although not shown in the drawing, the mounting plate 37 is provided with a plurality of apertures for receiving bolts therethrough and to thereby permit the plate to be readily secured to a frame of a vehicle adjacent one of the bumpers.

It will be noted that the piston 11 has opposite ends thereof closed in sealed relation, and that the interior 11a thereof defines a chamber. The chamber 11a constitutes a reservoir for a lubricating oil O for supplying lubricant to certain moving parts of the air cushion device. Referring to FIG. 2, it will be seen that chamber 11a communicates with the interior of the cylinder 10 through a port 11c, the port 11c being located axially forwardly of the forwardmost piston ring 12. Another port 11b intercommunicates the chamber 11a through the mediary of port 11c with the interior of the cylinder 10 at a point located rearwardly of the rearmost piston ring 12. With this arrangement, it will be seen that a suitable lubricant is provided to reduce the coefficient friction between the piston 11 and the cylinder 10 while still permitting an air seal to be maintained between the piston ring and a chamber 44a.

In use, two such air cushion devices will be used to support and interconnect an impact member such as a bumper 46 to an automobile frame as illustrated in FIG. 4. It will be noted that a large portion of the bumper 46 is illustrated in dotted line configuration. The mounting plate 37 will be secured to the frame of the automobile and each air cushion device will be connected by suitable conduits 43 to a source of air pressure such as an air tank T also carried by the vehicle at some suitable or convenient location. As pointed out above, the air supply to the entry chamber 44 is approximately 90 pounds per square inch.

Upon initial installation, air will be supplied to the entry chamber 44 of each air cushion device and air will pass through the passage 17a and thereafter into the ports 17. The pressure in the chamber 44 of cylinder 10 will, of course, be substantially less than the pressure in the entry chamber 44. Therefore, the piston 16 in response to this pressure differential, will move forwardly in axial direction so that the radial ports or passage 17 will be moved away from the annular ring 18, and will permit air pressure to be introduced to the chamber 44a, thus causing extension of the piston 11 to a full extended position, as illustrated in FIGS. 1 2, and 3. Therefore, the piston will be extended until the annular flange or jam ring 29 carried thereby engages the sleeve 36 as best seen in FIGS. 1 and 3. The chamber 44a will then receive air under pressure until the pressure therein approximates the pressure in the entry chamber 44, which will allow the piston 16 to be retracted slightly, whereby the port 17 will be closed by the annular member 18.

Thus, it will be seen that the air cushion after its initial installation will be normally extended and will be retracted in response to engagement of the bumper with another object.

When the bumper 46 engages another object, the impact or shock impulse will be transmitted by means of a thrust transmitting member 33 and the piston 11, and thereby cause retraction of the piston 11. Since the chamber 44 is substantially closed, retraction of the piston 11 will be cushioned by the air therein so that the shock impulse will be effectively dampened and absorbed.

As pointed out above, the lubricating oil will be dispersed through the ports or passages 11a and 11b to effectively lubricate the inner surface of the piston 10, and to thereby facilitate movement of the piston 11. A bleeder port 29a is formed in the plug 27 and communicates the interior of the piston 11 with the exterior. It is pointed out that this port 29a will normally be disposed upwardly with respect to the road surface or ground so that the oil will not inadvertently flow out of the piston 11.

In the event that the pressure within the chamber 44a drops below a predetermined pressure, preferably 90 lbs. p.s.i., then the piston 16 will move axially forwardly and open ports 17 and thereby permit air to enter into the chamber 44a until the pressure is equalized relative to the pressure in the entry chamber 44. It will therefore be seen that the air cushion device is self-adjusting and will constantly be urged into normal operation to the extended position.

From the foregoing description, it will be seen that I have provided a novel air cushion device which is effective for dampening and absorbing shock impulses transmitted thereto by an impact member to which the air cushion device is connected.

It will be also seen that my novel air cushion device is especially adaptable for use in supporting a conventional bumper, either rear or front, for automobile vehicles, and is capable of cushioning impact impulses transmitted thereto by such bumper.

Thus, it will be seen that I have provided a novel air-cushioning device which is not only of simple and inexpensive construction but one which functions in a more efficient manner than any heretofore known comparable device.

It will, of course, be understood that various changes may be made in the form, details, arrangement and proportions of the various parts without departing from the scope of my invention.

What is claimed is:

1. An air cushion device for absorbing shock impulses from an impact-receiving structure such as an automobile bumper or the like, said device comprising a cylinder adapted to be fixedly connected to the frame of a vehicle, the hollow interior of said cylinder defining an air chamber connected in communicating relation with a source of air under pressure, pressure responsive control means in one end of said cylinder comprising a sleeve element fixedly connected with said cylinder, a substantially flat piston element positioned adjacent one end of said sleeve element and having a stem integrally formed therewith disposed within said sleeve element, an elongate passage in said piston element and stem having one end communicating with said source of air under pressure and having a port at the other end thereof communicating with said cylinder chamber, said stem and piston element being slightly axially movable relative to said sleeve element between the normally closed position and an opened position, means on said stem engaging said sleeve and limiting axial movement of said stem and piston element during movement thereof towards the open condition, said piston cooperating with said sleeve for limiting axial movement thereof towards the closed condition, an annular yieldable closure element positioned around said stem and interposed between said sleeve element and said piston element to close said port when the air pressure within the cylinder chamber approximates a predetermined pressure, a yieldable member interposed around said stem and stem engaging means and being yieldable to permit said piston and stem to move slightly axially relative to said closure element from said normally closed position when the pressure within said cylinder falls below a predetermined level to interconnect the passage with said cylinder chamber and thereby permit air under pressure to be introduced into said cylinder chamber, an elongate tubular piston slidable in said cylinder chamber and having yieldable means in one end thereof engaging the outer surface of said cylinder chamber with air sealed effect and defining a piston head, the other end of said piston being adapted to be connected with the bumper of a vehicle, said piston being normally extended whereby shock impulse is transmitted to the piston by the bumper where it will be cushioned by air within the cylinder chamber during retraction of the piston.

2. The air cushion device as defined in claim 1 and a guide sleeve member fixedly connected with said cylinder and spaced axially therefrom and receiving said tubular piston therein for guiding the same during extension and retraction thereof.

3. The air cushion device as defined in claim 1 and stop means on said piston located exteriorly of said cylinder and cooperating with said guide sleeve for limiting extensible and retractive movement of said piston.

References Cited
UNITED STATES PATENTS

| | | | |
|---|---|---|---|
| 1,325,342 | 12/1919 | Watson et al. | 293—86 |
| 1,386,818 | 8/1921 | Walter | 267—32 |
| 1,504,505 | 8/1924 | Reed et al. | 293—85 X |
| 1,578,956 | 3/1926 | Clark | 293—86 |
| 1,811,152 | 6/1931 | Procofieff-Seversky | 244—100 |
| 1,925,461 | 9/1933 | Ridge | 293—86 |
| 2,461,066 | 2/1949 | Kent | 264—34 |
| 2,555,436 | 6/1951 | Druilhet | 293—85 |
| 2,977,146 | 3/1961 | Edwards et al. | 293—86 X |
| 3,008,746 | 11/1961 | Senger | 293—86 X |
| 3,134,619 | 5/1964 | Harrison | 293—73 X |
| 3,145,055 | 8/1964 | Carter | 293—85 X |
| 3,145,056 | 8/1964 | Blahnik | 293—85 X |
| 3,203,724 | 8/1965 | Brunt | 293—60 X |

FOREIGN PATENTS 1,280,548   11/1961   France.

ARTHUR L. LA POINT, *Primary Examiner.*

H. BELTRAN, *Assistant Examiner.*